United States Patent [19]
Heineck et al.

[11] Patent Number: 5,519,759
[45] Date of Patent: May 21, 1996

[54] METHOD FOR THE SYNCHRONIZATION OF BASE STATIONS IN A MULTICELLULAR, WIRELESS TELEPHONE SYSTEM

[75] Inventors: Frank Heineck, Munich; Karl Klug, Miesbach, both of Germany

[73] Assignee: Siemens Aktiengesellschaft, Munich, Germany

[21] Appl. No.: 250,482

[22] Filed: May 27, 1994

[30] Foreign Application Priority Data

May 28, 1993 [DE] Germany .................... 43 17 895.2

[51] Int. Cl.⁶ .................................................. H04Q 7/36
[52] U.S. Cl. ................. 379/59; 455/33.1; 455/51.1
[58] Field of Search ............................ 379/59; 455/33.1, 455/51.1; 375/356

[56] References Cited

U.S. PATENT DOCUMENTS

5,404,575  4/1995  Lehto ..................................... 455/51.1

FOREIGN PATENT DOCUMENTS

0226610  1/1987  European Pat. Off. .
0437835  7/1991  European Pat. Off. .
3011935  10/1981  Germany .

OTHER PUBLICATIONS

Telcom Report 8 (1985) Heft 5, Bernhard Hildebrandt, "Die Basisstation im Zellularen Funkfernsprechnetz C450", pp. 337–343.
Telcom Report 9 (1986), Wolfgang Riedel, "Netzsynchronitaet im Mobilfunksystem C450", pp. 286–288.
IEEE Communications, Jan. 1991, "A Business Cordless PABX Telephone System on 800 MHz Based on the DECT Technology", Colin Buckingham et al, pp. 105–110.
Ascom Technische Mitteilungen, Mar./Apr. 1991, "Die schnurlose Teilnehmervermittlungs–anlage CTS 800"–von der Idee zum Produkt., pp. 14–24.
Ericsson Review, No. 8, 1987, "Ericsson Cellular Mobile Telephone Systems", Goran Soderholm et al., pp. 42–49.
Funkschau 21/1990, Mobile Kommunikation "Schnurlose Burosysteme fur die neunziger Jahre", Von Geraldine Wilson, pp. 52–54.
Philips Telecommunication Review, vol. 49, No. 3, Sep. 1991, "DECT, A Universal Cordless Access System", R. J. Mulder, pp. 68–73.
Funkschau Nov. 1991, Funktechnik, "Die Basisstation im GSM–Mobilfunknetz", Von Rudi Markschlager, pp. 58–62.

*Primary Examiner*—Dwayne D. Bost
*Attorney, Agent, or Firm*—Hill, Steadman & Simpson

[57] ABSTRACT

The base stations (BS) in a multicellular, wireless telephone system are connected via trunk lines (VL) to a communication system (KS), particularly to a telephone private branch exchange. The base stations (BS) are arranged at such a distance from one another that synchronization information (si) wirelessly transmitted from one base station (BS) can be at least partially received in a neighboring base station (BS). Both the initial, wireless synchronization as well as the synchronization during operation are controlled by the communication system such that respectively one base station (BS) is synchronized to the synchronization information (si) transmitted from a neighboring base station (BS). Compared to a synchronization of the base stations (BS) via trunk lines (VL), these deviations due to running times and different processing speeds in the synchronization unit realized in circuit-oriented terms are avoided in the wireless synchronization. Furthermore, synchronization of base stations (BS) across communication systems is possible.

15 Claims, 2 Drawing Sheets

METHOD FOR THE SYNCHRONIZATION OF BASE STATIONS IN A MULTICELLULAR, WIRELESS TELEPHONE SYSTEM

BACKGROUND OF THE INVENTION

The present invention is directed to a method for synchronizing base stations in a multicellular, wireless telephone system, whereby the base stations are connected to a communication system via trunk lines.

Such a multicellular, wireless telephone system is disclosed in German Patent Application P 43 09 848.7 (corresponding to U.S. Ser. No. 214,570, filed Mar. 18, 1994 and hereby incorporated by reference) and is disclosed in the publication Telcom Report 8 (1985), No. 5, "Die Basisstation im zellularen Funkfernsprechnetz C450". A communication system, particularly a telecommunication private branch exchange, is connected via trunk lines to the base stations. Digitized voice and signaling information to be communicated from or to the communication terminal equipment, that is wirelessly connected to the base stations, is transmitted via the trunk lines. A communication of the synchronization information via the trunk lines is possible for base stations connected to a communication system by trunk lines. Phase deviations in the processing clock signals arise in the communication due to different trunk line running times and different processing speeds of the synchronization equipment that are realized in circuit-oriented terms. As a result phase deviations occur in the wireless or broadcast signals which cause particular disturbances in the coverage areas of the neighboring base stations.

A method for wireless synchronization of base stations for the radio telephone network C450 is described in another publication, Telcom Report 9 (1986), Special Issue "Nachrichtenuebertragung auf Funkwegen, pages 286–288, "Netzsynchronitaet im Mobilfunksystem C450". In this method, all other base stations are arranged around an initial base station in concentric rings. The initial base station wirelessly synchronizes the base stations of the first ring. The base stations of the first ring synchronize the base stations of the second ring, etc. Disturbances of the neighboring coverage areas are likewise possible due to different running times or phase deviations, particularly in neighboring base stations of one ring that are allocated to a common reference base station.

SUMMARY OF THE INVENTION

It is an object of the present invention to provide a method that avoids the disturbances in the coverage areas of the neighboring base stations caused by the phase deviations.

In general terms, the method of the present invention is for synchronization of base stations in a multicellular, wireless telephone system, whereby the base stations are connected to a communication system via trunk lines. Synchronization information is wirelessly transmitted from the base stations. The base stations are arranged at such a distance from one another that wirelessly received synchronization information can be at least partially received at least by one neighboring base station. The initial, wireless synchronization of all base stations in the multicellular, wireless telephone system and the wireless synchronization during operation are controlled by the communication system via the trunk lines such that one respective base station is synchronized onto the synchronization information transmitted from a neighboring base station.

Advantageous developments of the present invention are as follows.

Receivability of the wirelessly received synchronization signals is identified by a level measurement. In the level measurement, the level of the wirelessly received synchronization information is compared to a predetermined synchronization level and receivability information is formed insofar as the level of the wirelessly received synchronization information exceeds the synchronization level.

Given an initial synchronization controlled by the communication system all base stations are placed into a reception condition. Synchronization information stored in one of the base stations is wirelessly transmitted on the basis of start information communicated from the communication system in this base station. After a reception of the wirelessly transmitted synchronization information with an adequate level in one of the neighboring base stations, receivability information is formed therein and is transmitted to the communication system via trunk lines. After reception of receivability information in the communication system, the appertaining base station is initialized by communicating control information via the trunk lines to synchronize to the wirelessly received synchronization information and to transmit synchronization information stored therein. After reception of receivability information from further base stations, both the synchronization to the respective, wirelessly received synchronization information and the wireless transmission of synchronization information are repeated until all base stations are synchronized to the respective neighboring base station.

Given a reception of at least two receivability information from at least two base stations in the communication system, the appertaining base stations are interrogated with respect to the magnitude of the reception level of the wirelessly communicated synchronization information using level-measuring information communicated via trunk lines as well as using level result information. The base station that reported the highest reception level of the wirelessly received synchronization information is initiated to synchronize to the wirelessly received synchronization information. It is initiated thereto by the communication system by communicating control information via the trunk lines.

Given a reception of the wirelessly transmitted synchronization information with adequate level in at least one of the neighboring base stations, the reception level is measured therein and receivability information and level result information are formed therein and are communicated together to the communication system in terrestrial fashion. The base station that reported the highest reception level of the wirelessly received synchronization information is initiated to synchronize to the wirelessly received synchronization information, being initiated thereto by the communication system on the basis of a terrestrial communication of a control information.

A resynchronization of a base station during operation is implemented in the sequence determined in the initial synchronization, taking the existing master-slave relationships of the neighboring base stations into consideration. A resynchronization of the base station can be temporarily, regularly or constantly implemented.

The wireless synchronization of base stations can be implemented across communication systems.

In one embodiment the information to be wirelessly transmitted is formed according to the DECT standard.

A transmission unit as well as line termination units in the base station are realized by message switching units that can be coupled via a respective trunk line to a plurality of lower-ranking units representing individual transmission channels and that comprise a reception unit that evaluates signals supplied to it and edits these signals for further processing. A switching unit precedes the reception unit and is coupled to the trunk line. The switching unit through-connects one of the trunk lines dependent on a control signal. A watchdog unit is coupled to the trunk lines and detects the occurrence of transmission signals of the lower-ranking units on the respective trunk line and outputs corresponding control signals. A selection unit is coupled to the watchdog unit, to the switch unit and to the trunk line. The selection unit selects one of the trunk lines according to predetermined criteria dependent on the control signals of the watchdog unit and generates corresponding setting signals for the switching unit and for the lower-ranking units.

An important aspect of the method of the present invention is that the synchronization information effecting the synchronizing of the base stations is wirelessly sent from a base station. One of the neighboring base stations synchronizes to the received synchronization information, whereby this master-slave relationship of two neighboring base stations is fixed for resynchronizations during operation. The synchronization sequence, that is, which base station transmits synchronization information and which base station synchronizes to this synchronization information, is controlled by the communication system, particularly a telecommunication private branch exchange, via the trunk lines. The advantages of the method of the present invention is that, first, the disturbances in the coverage areas of neighboring base stations due to different phase relations of the radio signals are avoided and, second, a synchronization of neighboring base stations that are connected via trunk lines to different communication systems is enabled with the method of the present invention.

A further advantage of the method of the present invention is that the demands of the International DECT Standard (Digital European Cordless Telecommunication) can be realized in view of the synchronization deviations of neighboring base stations, particularly given neighboring base stations that are connected to different communication systems.

A further aspect of the method of the present invention is that the base stations are to be arranged at a distance from one another at which the synchronization information transmitted from the neighboring station can be at least partially received. The height of the level of the received synchronization information transmitted by the neighboring base station is provided as the criterion for determining the distance between two neighboring base stations. The synchronization range is essentially defined by the magnitude of the level of the wirelessly received synchronization information. When the level of the received synchronization signals exceeds a predetermined value, then the synchronization information is at least at sometimes receivable. This means that the synchronization information need not be constantly received in order to synchronize two neighboring base stations. This further means that the synchronization range lies substantially beyond a voice range between two base stations. The voice range, that is, the transmission range of the wireless telephone signals between the base stations and the wireless communication terminal equipment or a neighboring base station, is identified by the complicated measurement of a bit error rate, that is, the limit of the voice range has been reached when a predetermined bit error rate is exceeded. A distance between two base stations matched to a voice range to the connected communication terminal equipment remains under twice the voice range since an overlap of the voice range regions is required in order to form area-covering broadcast regions, particularly given multicellular, wireless telephone systems. Since the synchronization range lies substantially above the voice range of the neighboring base stations, the distance between the base stations matched to the voice range can be approximately retained using the method of the present invention and taking the broadcast-oriented scenario into consideration. That is, it is not to be substantially diminished, particularly since the message flow between the base stations is terrestrially implemented via the communication system.

According to an advantageous development of the method of the present invention, the level of the wirelessly received synchronization information is compared in a level measurement to a predetermined synchronization level. Receivability information is then formed insofar as the level of the wirelessly received synchronization information exceeds the synchronizing level. A base station lying closest to the base station transmitting the synchronization information is identified by this receivability information, particularly given a commissioning of the wireless telephone system. Since, as set forth above, the voice range to the connected communication terminal equipment is assured between two neighboring base stations due to the identification of the synchronization range, a level measurement of the synchronization distance that is extremely simple in comparison to a time-consuming measurement of bit error rate is established and the overlap of voice ranges is assured. This advantage of the communication system of the present invention is especially expressed by substantial time savings particularly in the installation or, respectively, commissioning of a multicellular, wireless telephone system.

Given a first-time synchronization of a plurality of base stations connected to a communication system, all base stations are first driven into a receive condition. By communicating start information from the communication system to a specific base station, for example a base station having port number 1, synchronization information stored therein is wirelessly transmitted via broadcast means. After a reception of the wirelessly transmitted synchronization information with adequate level in one of the neighboring base stations, receivability information is formed therein and is communicated to the communication system via trunk lines. When receivability information is received from one of the base stations, then this base station is initiated by communicating a control information to synchronize to the wirelessly received synchronization information and to broadcast synchronization information stored therein. It is thereby assumed that only the neighboring base station can communicate synchronizability information to the communication system. The reception of the receivability information by further base stations as well as the synchronizing to the respectively wirelessly received synchronization information and the wireless transmission of synchronization information is repeated until all base stations are synchronized to the respective neighboring station.

Given a reception of more than two receivability information in the communication system, that is, the synchronization information transmitted by different base station, are received in more than one base station, the appertaining base stations are interrogated with respect to the magnitude of the reception level of the wirelessly received synchronization information by the communication system with the respective assistance of level-measuring information as well as of level result information communicated via trunk lines.

The received information is evaluated in the communication system with respect to the magnitude of the reception level and that base station that reported the highest level of the wirelessly received synchronization information is initiated to synchronize to the wirelessly received synchronization information on the basis of a terrestrial communication of control information. A respective master-slave allocation of two base stations is also enabled by this measure in extensive, wireless, multi-cellular telephone systems.

In larger, multicellular, wireless telephone systems, the level interrogation described above causes considerable control outlay in communication systems. This control outlay is reduced in that, following reception of the wirelessly transmitted synchronization information with adequate level in at least one of the neighboring base stations, the reception level therein is measured and receivability information and level burst result information are formed and are communicated together terrestrially to the communication system.

For a resynchronization of the base stations during operation, the sequence defined in the initial synchronization is maintained, taking the master-slave relationships of the neighboring base stations into consideration. A resynchronization of the base stations can be temporarily implemented, that is, at irregular longer time intervals, can be regularly implemented at shorter or longer time intervals or can be constantly implemented. A resynchronization is usually implemented at irregular time intervals, preferably given a control means of the communication system that is dynamically less loaded.

According to a further advantageous development of the method of the present invention, the information to be wirelessly communicated is formed according to the DECT standard. The demands with respect to permitted phase deviations of processing clocks of neighboring base stations are defined in this DECT standard.

The communication system as well as the base stations are advantageously realized according to the multicellular, wireless telephone system proposed in German Patent Application P 43 09 848.7. An especially economical program-oriented and circuit-oriented realization of multicellular wireless telephone systems is possible in such a realization due to a substantial integration of the individual components in integrated circuits.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENT

Figure 1:
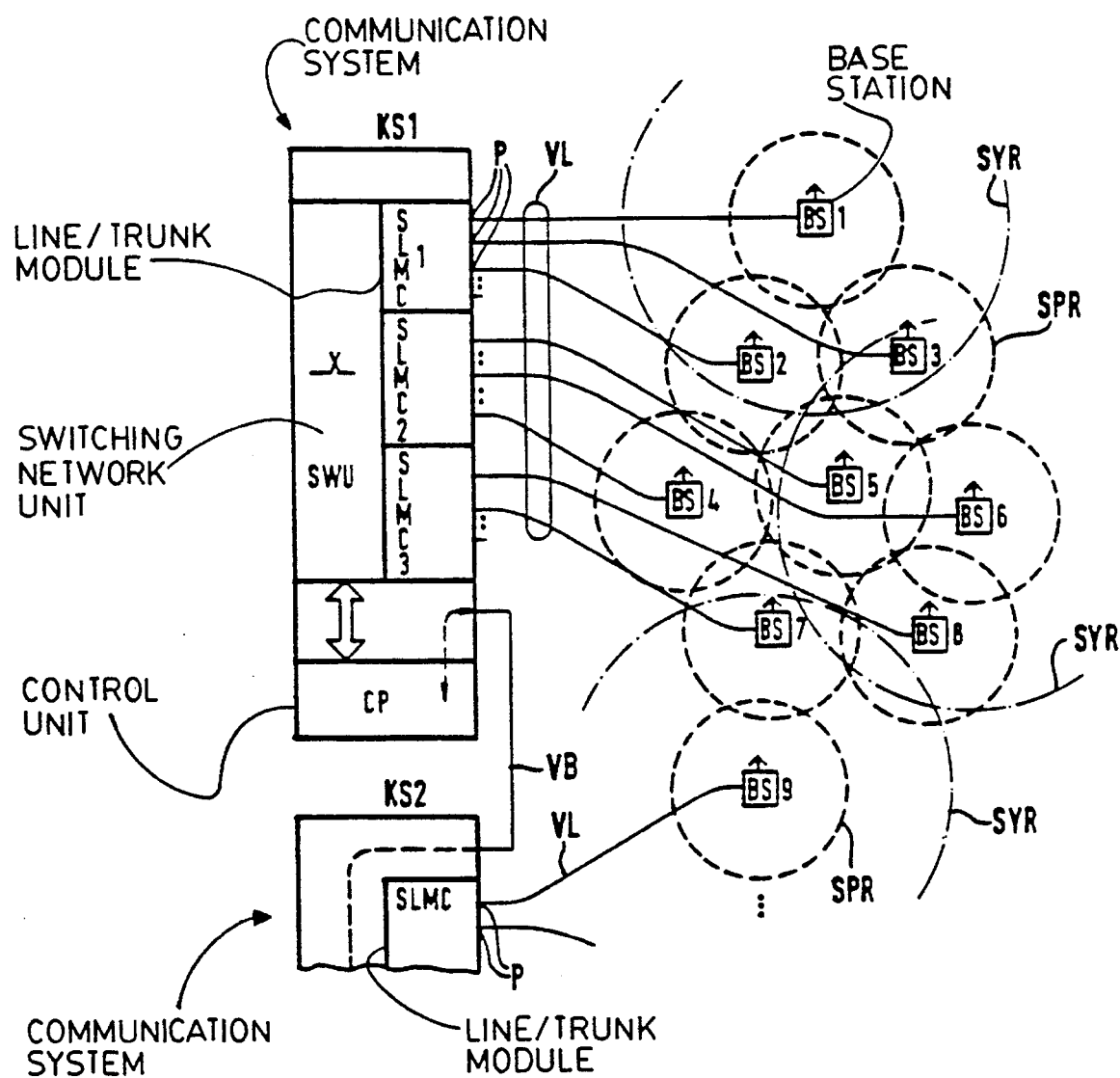
FIG. 1 is a block circuit diagram of a wireless multicellular telephone system.

FIG. 1 shows a wireless multicellular telephone system that is formed by a first and by a partially shown second communication system KS1, KS2. Eight base stations BS1 ... BS8 are connected to the first communication system KS1, each via a respective trunk line VL. Three base station line/trunk modules SLMC 1 ... SLMC3 are provided in the first communication system KS1 for the connection of the base stations BS1 ... BS8. Each of the base station line/trunk modules SLMC 1 ... SLMC3 is equipped with up to eight transmission system interfaces P for the connection of a respective trunk line VL (indicated by dots). Let it be assumed by way of example for the exemplary embodiment that respectively three transmission system interfaces P in the first and second base station line/trunk modules SLMC 1, SLMC2 are wired to a respective trunk line VL and the third base station line/trunk module SLM 3 is wired with two trunk lines VL. The digitized voice and signaling signals to be communicated from or to the communication terminal equipment (not shown) wirelessly connected to the base stations BS 1 ... BS8 are communicated via the transmission system interfaces P according, for example, to burst transmission operation. A switching network unit SWU as well as a control means CP are provided in the first communication system KS 1 for the switching-oriented control of the message and signaling information communicated or to be communicated by the base stations BS 1 ... BS8. The base stations BS 1...BS8 and the first and second communication systems KS 1, KS 2 are realized, for example, according to the multicellular, wireless telephone system proposed in German Patent Application P 43 09 848.7.

A voice range SPR is illustrated by the broken-line circles around a respective base station BS 1 ... BS8. The voice range SPR indicates the limit within which wireless communication terminal equipment (not shown) can wirelessly communicate with the base station BS 1 ... BS8 located in the center. As already set forth, the voice range SPR is identified on the basis of a bit rate measurement, whereby the bit error rate of the digitized voice and signaling information in the wireless communication is measured. As known, a neighboring base station BS 1 ... BS8 would then have to respectively lie within the voice range SPR in order to communicate information. The method of the present invention, by contrast, proceeds therefrom that it is not the bit error rate of the communicated radio signals but the reception level that is utilized for the determination of synchronization information for dimensioning the distance between the base stations BS 1 ... BS8. It is allowable that the synchronization information can only be received at times due to fluctuating reception conditions, for example, day and night. Despite this part-time receivability, a synchronization of the base stations BS1 ... BS8 to one another is possible since a constant synchronization is not required and a communication of synchronization information need only be provided at certain minimum time intervals. The resulting synchronization range SYR is depicted in FIG. 1 on the basis of dot-dash lines shown around the first and around the sixth base stations BS 1, BS6. The base stations BS1 ... BS8 are arranged such that at least one of the neighboring base stations BS 1 ... BS8 lies within the region of the synchronization range SYR. As a result of the substantial increase of the synchronization range SYR beyond the voice range SPR, a multicellular wireless telephone system can be approximately configured that, taking the radio transmission conditions into consideration, differs insignificantly from a network design based on a voice range SPR.

The partially shown, second communication system KS2 has a base station line/trunk module SLMC shown by way of example to whose transmission system interface P a ninth base station BS9 is connected via a trunk line VL. As in the case of the base stations BS1 ... BS8 of the first communication system KS1, the voice range SPR thereof overlaps with at least one voice range SPR of a neighboring base station BS1 . . . BS8, specifically the voice range SPR of the seventh base station BS7 in the exemplary embodiment. Analogously thereto, at least one neighboring base station BS1 . . . BS8 lies within the synchronization range SYR of the ninth base station BS9, that is neighboring seventh base station BS7 in the exemplary embodiment. The two communication systems KS1, KS2 are connected via a connection VB for the purpose of a communication exchange. Usually, such a connection VB is realized with a known "trunk connection".

Figure 2:
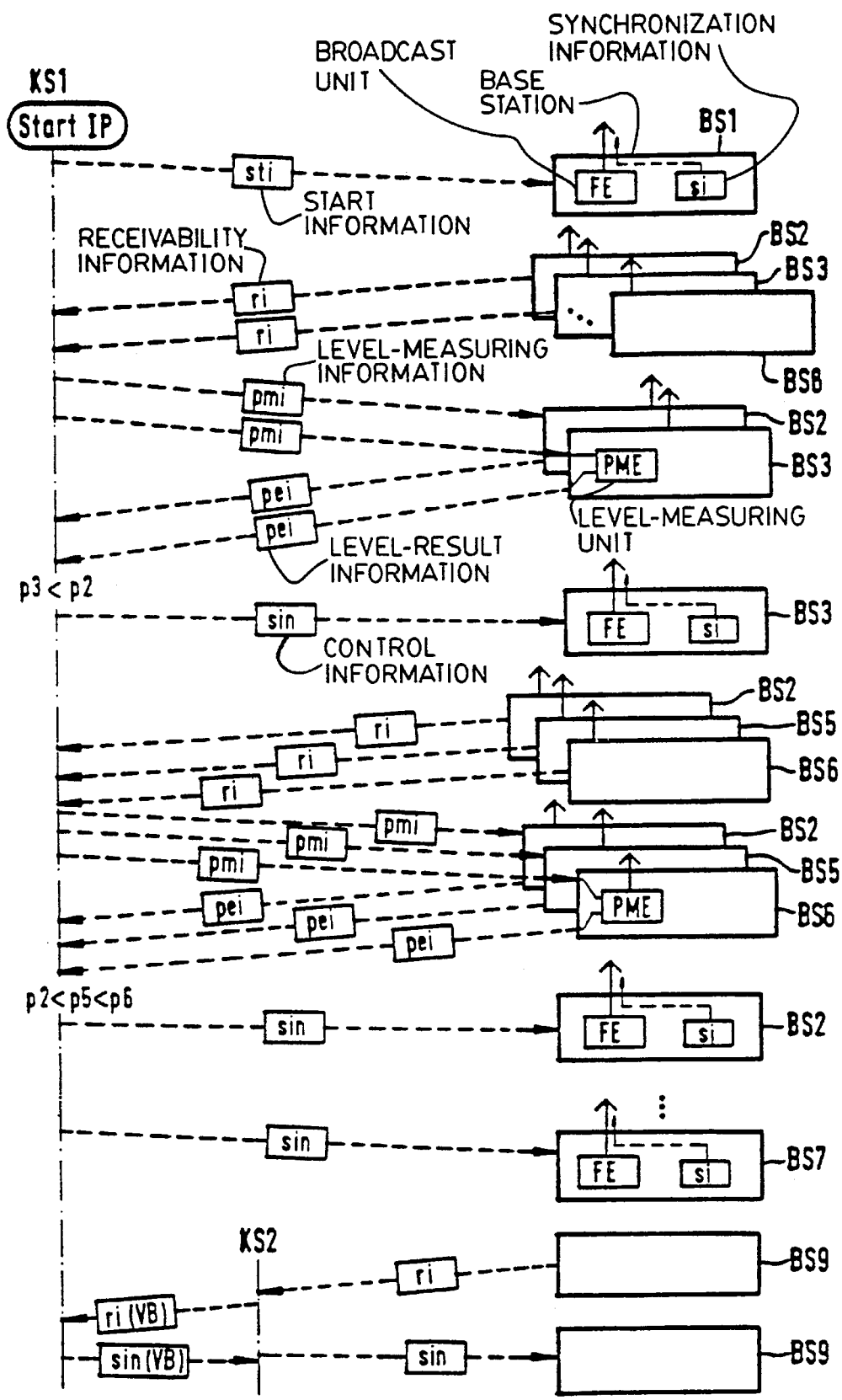
FIG. 2 is a flowchart showing the method steps in a first-time synchronization of the base stations according to FIG. 1.

A flowchart is depicted in FIG. 2 and shows the synchronization of the base stations BS1 . . . BS9 connected to the two communication systems KS1, KS2. The communication systems KS1, KS2 are shown in the left-hand region of FIG. 2 with dot-dash lines. The message flow between the communication systems KS1, KS2 and the base stations BS1 . . . BS9 shown in the right-hand area of FIG. 2 is indicated by broken lines, whereby information to be communicated is inserted into the message flow.

Let it be assumed for the exemplary embodiment that the synchronization is initialized for the first time following an installation of the communication systems KS1, KS2 and of the base stations BS1 . . . BS9. After the start of the initialization procedure IP in the first communication system KS1, start information sti is formed and is communicated to the first base station BS1. Fundamentally, the synchronization can be initialized with each of the base stations BS1 . . . BS9.

After the reception of the start information sti in the first base station BS1, synchronization information si are wirelessly transmitted in this using a broadcast means FE. The synchronization information si stored in the first base station is formed in a known way in, for example, a clock means (not shown) that determines the processing speed.

According to the configuration of the base stations BS1 . . . BS8 in FIG. 1, the second and third base station BS2, BS3 lie within the synchronization range SYR of the first base station BS1. Consequently, the synchronization information si is received with adequate level in the second and third base stations BS2, BS3. As a result receivability information ri is formed in these base stations BS2, BS3 and is terrestrially communicated to the first communication system KS1.

Since two base stations BS2, BS3 can be synchronized to the synchronization information si transmitted by the first base station BS1, one of the two stations BS2, BS3 is selected by a level measurement of the received synchronization information si. Level-measuring information pmi are thereby communicated to the second and third base stations BS2, BS3, the level of the received synchronization information si is measured therein using a level-measuring means PME.

Subsequently, the measured results are communicated to the first communication system KS1 using level result information pei. The procedure can be eliminated when the level of the received synchronization information is measured upon first-time reception and the level result information pei is already communicated to the communication system together with the receivability information ri. Let it be assumed for the exemplary embodiment that a higher level is measured in the third base station BS3 than in the second base station BS2. Consequently, control information sin is communicated to the third base station BS3, as a result whereof a synchronization to the received synchronization information si is initiated in the third base station BS3. Due to the synchronization, a phase locked synchronization of the time slots that are sent out is effected relative to one another, whereby the beginning and the end of a time slot are coherent among the base stations. Simultaneously, a transmission of synchronization information si constructed analogously to the first base station BS1 is effected in this third base station BS3.

Since this synchronization information si according to FIG. 1 can be received in the second, fifth and sixth base stations BS2, BS5, BS6 and these base stations BS2, BS5, BS6 lie within the synchronization range SYR of the third base station BS3, a respective receivability information ri is formed in these base stations BS2, BS5, BS6 and is communicated to the first communication system. Since three receivability information ri are present, the level of the receive synchronization information si is respectively measured in the second, fifth and sixth base stations BS2, BS5, BS6 using a level-measuring means PME by respectively communicating phase-measuring information pmi to the second, fifth and sixth base station BS2, BS5, BS6 and the measured result is transmitted to the first communication system KS1 using level result information pei. Let it be assumed for the exemplary embodiment that the highest level was measured in the second base station BS2 and control information sin is communicated thereto. As a result thereof, a synchronization of the second base station BS2 to the synchronization information si that was wirelessly transmitted from the third base station BS2 is initialized. At the same time, the transmission of synchronization information si formed in the second base station BS2 is effected.

The repeating events for the synchronization of the fourth through eighth base stations are shown in FIG. 2 with dotted lines. A synchronization of base stations BS1 . . . BS9 that extends beyond one communication system is also shown in FIG. 2. It is thereby assumed that control information sin is communicated to the seventh base station BS7 from the first communication system KS1 and a synchronization to the previously communicated synchronization information si is effected thereat. Simultaneously, synchronization information si formed in the seventh base station BS7 is wirelessly transmitted using the broadcast means FE. These synchronization information si are received with adequate level in the ninth base station BS9, as a result whereof receivability information ri is formed therein and is communicated to the second communication system KS2. The receivability information ri is conducted to the first communication system KS1 by the second communication system via the connection VB. Since only one receivability information ri for the synchronization information si transmitted in the seventh base station BS7 is present, control information sin is formed and is communicated to the ninth base station BS9 via the second communication system KS2. A synchronization to the received synchronization information si of the seventh base station BS7 is effected in this ninth base station BS9.

Following the initial synchronization of the base stations BS1 . . . BS9 set forth above, a resynchronization is now possible at greater time intervals during operation, since the base stations BS1 . . . BS9 are supplied via a common communication system transmission clock. In particular, a resynchronization of the base stations BS1 . . . BS9 to one another is implemented in operating phases wherein the control means CP of the communication systems KS1, KS2 are not fully used. The resynchronization is implemented in the sequence determined in the initial synchronization, taking the master-slave relationships of the base stations BS1 .

... BS9 to one another into consideration. Since wireless telephone systems shall be realized in future according to the DECT standard, a synchronization of the base stations BS1 ... BS9 is effected in that a slave base station synchronizes to a wirelessly transmitted time slot structure of the master base station BS1 ... BS9. The information with respect to this time slot structure is stored in the base stations BS1 ... BS9 and is read using a base station control means (not shown) and is communicated to a broadcast means FE wherein such information is converted into corresponding, DECT conforming radio signals.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A method for synchronizing of base stations in a multi-cellular wireless telephone system, the base stations being connected to a communication system via trunk lines, comprising the steps of:

wirelessly transmitting synchronization information from the base stations and wirelessly receiving synchronization information at the base stations;

arranging the base stations at a distance from one another such that respective wirelessly received synchronization information is at least partially received by at least one neighboring base station to a base station that transmitted the respective wirelessly received synchronization information; and controlling, with the communication system via the trunk lines, an initial wireless synchronization of all base stations in the multicellular wireless telephone system and further wireless synchronization during operation of the telephone system such that a respective base station is synchronized to the synchronization information transmitted from a neighboring base station to the respective base station;

placing all base stations into a reception condition;

wirelessly transmitting synchronization information that is stored in one base station of the base stations in response to start information communicated from the communication system to said one base station;

forming, after a reception of the wirelessly transmitted synchronization information with at least a predetermined level in one of the neighboring base stations to said one base station, receivability information in the one of the neighboring base stations and transmitting the receivability information to the communication system via trunk lines;

initializing, after reception of receivability information in the communication system, the one of the neighboring base stations by communicating control information via the trunk lines to synchronize to the wirelessly received synchronization information and to transmit synchronization information stored therein; and repeating after a reception of receivability information from further base stations, both the synchronization to the respective wirelessly received synchronization information and the wireless transmission of synchronization information until all base stations are synchronized to respective neighboring base station.

2. The method according to claim 1, wherein the method further comprises the step of interrogating, given a reception of at least two receivability information from at least two base stations in the communication system, the two base stations with respect to magnitude of reception levels of the wirelessly communicated synchronization information using level-measuring information communicated via trunk lines and using level result information; and initiating that base station of the two base stations that has the highest reception level of the wirelessly received synchronization information to synchronize to the wirelessly received synchronization information, being initiated by the communication system by communicating control information via the trunk lines.

3. Method according to claim 1, wherein the method further comprises the step of measuring, given a reception of the wirelessly transmitted synchronization information with at least a predetermined level in at least one of the neighboring base stations, a reception level of the at least one of the neighboring base stations and forming receivability information and level result information therein and communicating the receivability information and the level result information to the communication system in terrestrial fashion; and initiating that base station of the at least one of the neighboring base stations that has a highest reception level of the wirelessly received synchronization information to synchronize to the wirelessly received synchronization information, being initiated by the communication system using terrestrial communication of control information.

4. The method according to claim 1, wherein the method further comprises the step of implementing resynchronization of a respective base station during operation in a sequence determined in the initial wireless synchronization, utilizing existing master-slave relationships of the neighboring base stations to the respective base station.

5. The method according to claim 4, wherein resynchronization of the respective base station is one of temporarily implemented, regularly implemented or constantly implemented.

6. The method according to claim 1, wherein the method further comprises the step of providing a transmission unit and line termination units in each of the base stations, the transmission units and line termination units being formed by message switching units that are coupled via a respective trunk line to a plurality of lower-ranking units representing individual transmission channels, each of the transmission units and line termination units having a reception unit that evaluates signals supplied thereto and that edits said signals for further processing, and each of the transmission units and line termination units having a respective switching unit that precedes the reception unit and is coupled to the trunk line, said respective switching unit through-connecting one of the trunk lines dependent on a control signal, and each of the transmission units and line termination units having a watchdog unit coupled to the trunk lines that detects an occurrence of transmission signals of the lower-ranking units on a respective trunk line and outputs corresponding control signals, and each of the transmission units and line termination units having a selection unit coupled to the watchdog unit, to the switch unit and to the trunk line, said selection unit selecting one of the trunk lines according to predetermined criteria dependent on the control signals from the watchdog unit and generating corresponding setting signals for the switching unit and for the lower-ranking units.

7. A method for synchronizing of base stations in a multicellular wireless telephone system, the base stations being connected to a communication system via trunk lines, comprising the steps of:

wirelessly transmitting synchronization information from the base stations and wirelessly receiving synchronization information at the base stations;

arranging the base stations at a distance from one another such that respective wirelessly received synchronization information is at least partially received by at least one neighboring base station to a base station that transmitted the respective wirelessly received synchronization information;

controlling, with the communication system via the trunk lines, an initial wireless synchronization of all base stations in the multicellular wireless telephone system and further wireless synchronization during operation of the telephone system such that a respective base station is synchronized to the synchronization information transmitted from a neighboring base station to the respective base station, said controlling being effected by identifying receivability of the wirelessly received synchronization signals by a level measurement, and by comparing, in the level measurement, a level of the wirelessly received synchronization information to a predetermined synchronization level and forming receivability information indicative of the level of the wirelessly received synchronization information exceeding the predetermined synchronization level; and given an initial synchronization controlled by the communication system, placing all base stations into a reception condition;

wirelessly transmitting synchronization information that is stored in one base station of the base stations in response to start information communicated from the communication system to said one base station;

forming, after a reception of the wirelessly transmitted synchronization information with at least a predetermined level in one of the neighboring base stations to said one base station, receivability information in the one of the neighboring base stations and transmitting the receivability information to the communication system via trunk lines;

initializing, after reception of receivability information in the communication system, the one of the neighboring base stations by communicating control information via the trunk lines to synchronize to the wirelessly received synchronization information and to transmit synchronization information stored therein; and repeating after a reception of receivability information from further base stations, both the synchronization to the respective wirelessly received synchronization information and the wireless transmission of synchronization information until all base stations are synchronized to respective neighboring base station.

8. The method according to claim 7, wherein the method further comprises the step of interrogating, given a reception of at least two receivability information from at least two base stations in the communication system, the two base stations with respect to magnitude of reception levels of the wirelessly communicated synchronization information using level-measuring information communicated via trunk lines and using level result information; and initiating that base station of the two base stations that has the highest reception level of the wirelessly received synchronization information to synchronize to the wirelessly received synchronization information, being initiated by the communication system by communicating control information via the trunk lines.

9. Method according to claim 7, wherein the method further comprises the step of measuring, given a reception of the wirelessly transmitted synchronization information with at least a predetermined level in at least one of the neighboring base stations, a reception level the at least one of the neighboring base stations and forming receivability information and level result information therein and communicating the receivability information and the level result information to the communication system in terrestrial fashion; and initiating that base station the at least one of the neighboring base stations that has a highest reception level of the wirelessly received synchronization information to synchronize to the wirelessly received synchronization information, being initiated by the communication system using terrestrial communication of control information.

10. The method according to claim 7, wherein the method further comprises the step of providing a transmission unit and line termination units in each of the base stations, the transmission units and line termination units being formed by message switching units that are coupled via a respective trunk line to a plurality of lower-ranking units representing individual transmission channels, each of the transmission units and line termination units having a reception unit that evaluates signals supplied thereto and that edits said signals for further processing, and each of the transmission units and line termination units having a respective switching unit that precedes the reception unit and is coupled to the trunk line, said respective switching unit through-connecting one of the trunk lines dependent on a control signal, and each of the transmission units and line termination units having a watchdog unit coupled to the trunk lines that detects an occurrence of transmission signals of the lower-ranking units on a respective trunk line and outputs corresponding control signals, and each of the transmission units and line termination units having a selection unit coupled to the watchdog unit, to the switch unit and to the trunk line, said selection unit selecting one of the trunk lines according to predetermined criteria dependent on the control signals from the watchdog unit and generating corresponding setting signals for the switching unit and for the lower-ranking units.

11. A method for synchronizing of base stations in a multicellular wireless telephone system, the base stations being connected to a communication system via trunk lines, comprising the steps of:

wirelessly transmitting synchronization information from the base stations and wirelessly receiving synchronization information at the base stations;

arranging the base stations at a distance from one another such that respective wirelessly received synchronization information is at least partially received by at least one neighboring base station to a base station that transmitted the respective wirelessly received synchronization information;

controlling, with the communication system via the trunk lines, an initial wireless synchronization of all base stations in the multicellular wireless telephone system and further wireless synchronization during operation of the telephone system such that a respective base station is synchronized to the synchronization information transmitted from a neighboring base station to the respective base station, said controlling being effected by measuring, given a reception of the wirelessly transmitted synchronization information with at least a predetermined level in at least one of the neighboring base stations, a reception level of the at least one of the neighboring base stations and forming receivability information and level result information therein and communicating the receivability information and the level result information to the communication system in terrestrial fashion, and by comparing a level of the wirelessly received synchronization information to a predetermined synchronization level and forming receivability information indicative of the level of the wirelessly received synchronization information exceeding the predetermined synchronization level;

given an initial synchronization controlled by communication system;

placing all base stations into a reception condition;

wirelessly transmitting synchronization information that is stored in one base station of the base stations in response to start information communicated from the communication system to said one base station;

forming, after a reception of the wirelessly transmitted synchronization information with at least a predetermined level in one of the neighboring base stations to said one base station, receivability information in the one of the neighboring base stations and transmitting the receivability information to the communication system via trunk lines, and initializing, after reception of receivability information in the communication system, the one of the neighboring base stations by communicating control information via the trunk lines to synchronize to the wirelessly received synchronization information and to transmit synchronization information stored therein, and, given a reception of at least two receivability information from at least two base stations in the communication system, interrogating the two base stations with respect to magnitude of reception levels of the wirelessly communicated synchronization information using level-measuring information communicated via trunk lines and using level result information, and initiating that base station of the two base stations that has the highest reception level of the wirelessly received synchronization information to synchronize to the wirelessly received synchronization information, being initiated by the communication system by communicating control information via the trunk lines;

repeating after a reception of receivability information from further base stations, both the synchronization to the respective wirelessly received synchronization information and the wireless transmission of synchronization information until all base stations are synchronized to respective neighboring base station;

wherein that base station of the at least one of the neighboring base stations is initiated that has a highest reception level of the wirelessly received synchronization information to synchronize to the wirelessly received synchronization information, being initiated by the communication system using terrestrial communication of control information.

12. The method according to claim 11, wherein the method further comprises the step of implementing resynchronization of a respective base station during operation in a sequence determined in the initial wireless synchronization, utilizing existing master-slave relationships of the neighboring base stations to the respective base station.

13. The method according to claim 12, wherein resynchronization of the respective base station is one of temporarily implemented, regularly implemented or constantly implemented.

14. The method according to claim 11, wherein a plurality of communication systems have base stations and wherein the wireless synchronization of base stations is implemented across the communication systems.

15. The method according to claim 11, wherein the method further comprises the step of providing a transmission unit and line termination units in each of the base stations, the transmission units and line termination units being formed by message switching units that are coupled via a respective trunk line to a plurality of lower-ranking units representing individual transmission channels, each of the transmission units and line termination units having a reception unit that evaluates signals supplied thereto and that edits said signals for further processing, and each of the transmission units and line termination units having a respective switching unit that precedes the reception unit and is coupled to the trunk line, said respective switching unit through-connecting one of the trunk lines dependent on a control signal, and each of the transmission units and line termination units having a watchdog unit coupled to the trunk lines that detects an occurrence of transmission signals of the lower-ranking units on a respective trunk line and outputs corresponding control signals, and each of the transmission units and line termination units having a selection unit coupled to the watchdog unit, to the switch unit and to the trunk line, said selection unit selecting one of the trunk lines according to predetermined criteria dependent on the control signals from the watchdog unit and generating corresponding setting signals for the switching unit and for the lower-ranking units.

* * * * *